March 29, 1960   J. H. NEWITT   2,930,311
COFFEE BREWER

Filed Dec. 4, 1956   3 Sheets-Sheet 1

John H. Newitt
Inventor
by Porter, Chittick, and Russell
Attorneys

March 29, 1960     J. H. NEWITT     2,930,311
COFFEE BREWER

Filed Dec. 4, 1956     3 Sheets-Sheet 2

John H. Newitt
Inventor
by Porter, Chittick and Russell
Attorneys

March 29, 1960

J. H. NEWITT 2,930,311

COFFEE BREWER

Filed Dec. 4, 1956

John H. Newitt
Inventor
by Porter, Chittick and Russell
Attorneys

United States Patent Office 2,930,311
Patented Mar. 29, 1960

2,930,311

COFFEE BREWER

John H. Newitt, North Scituate, Mass.

Application December 4, 1956, Serial No. 626,243

1 Claim. (Cl. 99—285)

This invention relates to the art of brewing coffee, and more particularly to a novel method of brewing coffee and novel apparatus for brewing coffee according to said novel method.

While many different types of portable coffee brewers have been made available commercially, there still exists the need for an inexpensive, simple, easy to operate coffee maker which is so designed that (1) volatile essences cannot escape from the coffee and (2) coffee can be brewed without being contacted with boiling water. Confinement of the volatile components of the coffee is important since they contribute greatly to the taste of the brew. The reason for preventing the coffee from being contacted with boiling water is that boiling water will extract or free many of the bitter constituents of the coffee.

Accordingly the general object of this invention is to provide a novel method and apparatus for brewing coffee wherein the coffee is brewed in a closed chamber from which the volatile constituents of the coffee cannot escape to the atmosphere and into which hot water for brewing is introduced only when its temperature is below boiling.

A more specific object of this invention is to provide a method for brewing coffee comprising the steps of placing a charge of coffee in the open bottom end of a container whose top end is closed, placing the open end of the container in a vessel holding water, heating the vessel and container to purge air from said container, reducing the pressure in said container so that water in liquid form will flow from said vessel into said container, and allowing the water in said container to percolate through the charge of coffee back into said vessel, whereby the water will extract the soluble essences from the coffee as it flows back into said vessel.

Another object of this invention is to provide coffee brewing apparatus comprising a vessel vented to the atmosphere for containing water, a container open only at its bottom end positioned in said vessel, and means attached to said container for supporting a charge of coffee in its bottom end, said means comprising a filter through which steam and water may pass.

Other objects and many of the attendant advantages of this invention will be readily appreciated as the same becomes better understood by reference to the following detailed description when considered in connection with the accompanying drawings, wherein.

The present invention makes use of an open lower vessel which contains water and is heated, and an upper vessel which is inserted into the lower vessel and normally has a single opening communicating with the water in said lower vessel. The charge of coffee to be brewed is supported within the upper vessel. The upper vessel may be fixed or free to move up and down in relation to the lower vessel. The upper vessel forms an enclosed chamber and is sealed off from contact with the outside air during operation. The method of the present invention involves a purge cycle, an inflow cycle, a brewing cycle and a percolating cycle. In the purge cycle, the air in the upper vessel is heated. As its temperature goes up it expands and escapes from the upper vessel into the water of the lower vessel and bubbles through the water to the atmosphere. In the inflow cycle the upper vessel is cooled. As it cools, the air and steam in the upper vessel contract thereby effecting a reduction in pressure. Due to the difference between the reduced pressure in the upper vessel and the atmospheric pressure, the water in the lower vessel flows into the upper vessel until the pressure therein is of the same magnitude as the atmospheric pressure. The brewing cycle actively commences when the water flows into the upper vessel and continues through the percolating cycle. The percolating cycle actively starts when the upper vessel is lifted out of the water of the lower vessel, whereupon the water in the upper vessel percolates down through the charge of coffee back into the lower vessel. The percolating and brewing cycles terminate when all of the water in the upper vessel has returned to the lower vessel.

Figure 1:
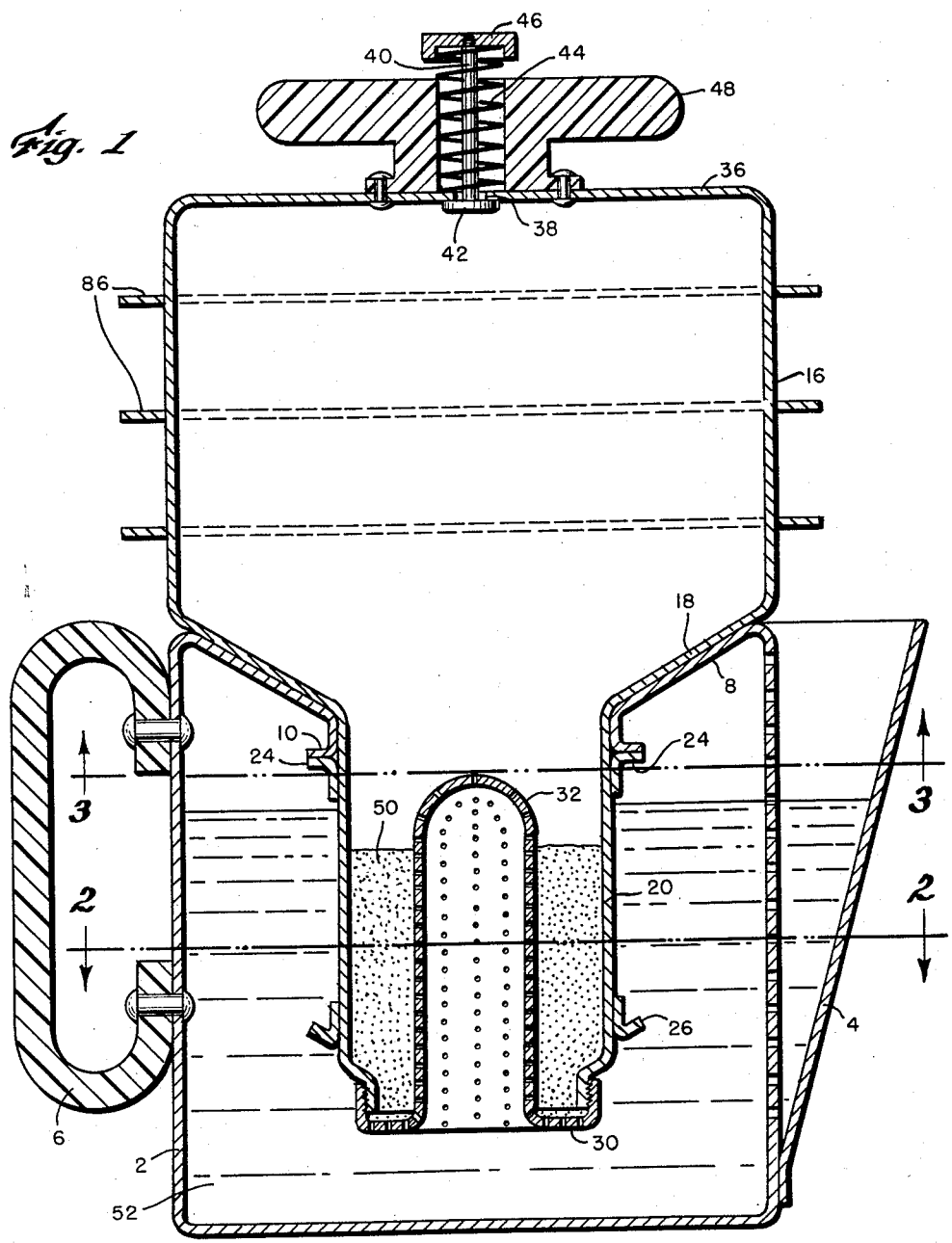
Fig. 1 is a sectional view in elevation of a first form of the present invention.
Figure 2:
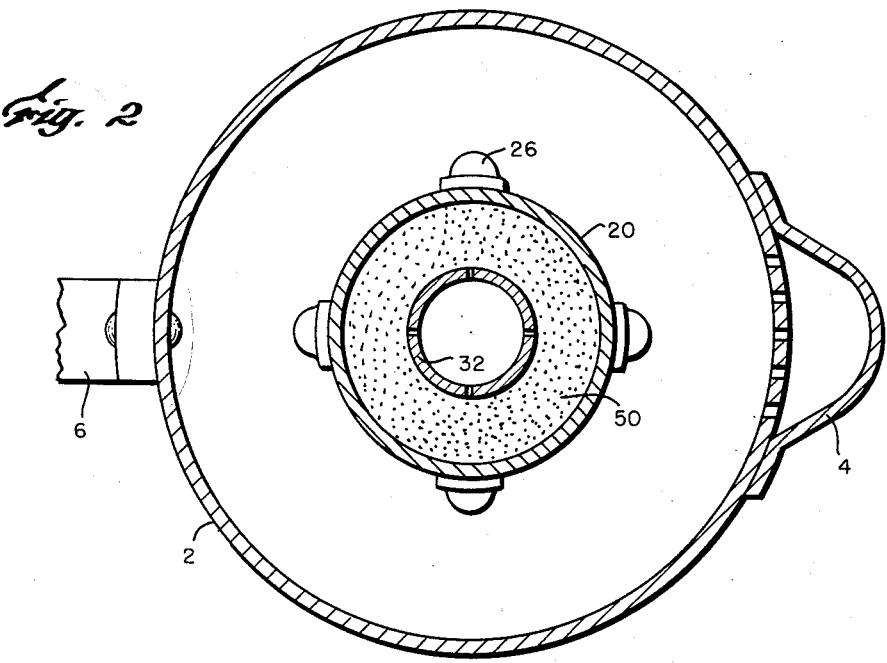
Fig. 2 is a sectional view taken along line 2—2 of Fig. 1.
Figure 3:
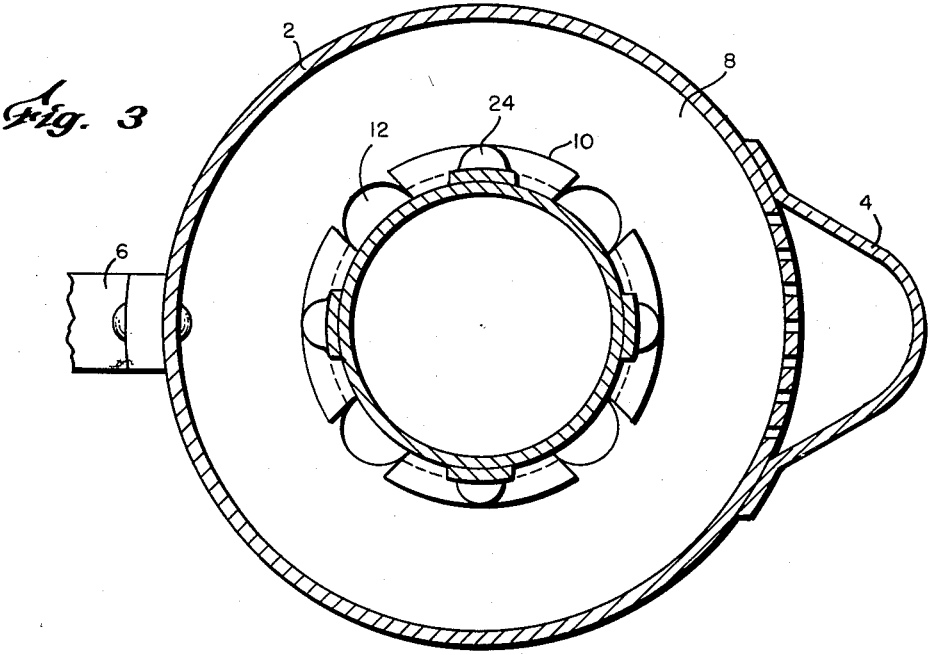
Fig. 3 is a sectional view taken along line 3—3 of Fig. 1.

Fig. 1 illustrates one embodiment of the apparatus phase of this invention whose use is characterized by the foregoing cycles of operation. This embodiment comprises a bottom vessel 2 provided with a pour spout 4 and a handle 6. The upper end of this vessel is provided with an inturned flange 8 having spaced outwardly extending tabs 10 and openings 12. Associated with bottom vessel 2 is a top vessel 16 having an inwardly sloping wall 18 and a neck 20. The side wall of neck 20 is provided with a first set of lock tabs 24 adjacent sloping wall 18 and a second set of lock tabs 26 close to its lower end. Tabs 26 slope upwardly at the same angle as flange 8 of the bottom vessel. The bottom end of neck 20 is threaded to receive a screw-type non-clog filter member comprising a radial flange 30 and a central cylinder 32 which is closed only at its free end. Both flange 30 and central cylinder 32 are perforated so as to pass water but to hold back the particles or grounds of the coffee from which the beverage is to be brewed. The upper end 36 of top vessel 16 is provided with a small vent hole 38 through which extends the spindle 40 of a valve member 42. A spring 44, acting between the top end 36 of the vessel and a button 46 attached to the upper end of the spindle, biases the valve to closed position. A cylindrical plastic lift knob 48 is attached to the upper end 36 of the top vessel in surrounding relation to the vent valve assembly.

The method of brewing coffee using the aforesaid coffee brewing apparatus is as follows. A predetermined volume of water 52 is added to bottom vessel 2. The top vessel 16 is upended from the position shown in Fig. 1, the filter member is unscrewed, a charge of coffee 50 is dumped into the vessel, and the filter replaced. Then the vessel is inverted again to the position shown in Fig. 1. When this is done the charge of coffee drops into the annular space defined by the neck 20 and the central cylinder portion 32 of the filter and is supported by the radial flange portion 30 of the filter. Thereafter the upper vessel is oriented so that its tabs 24 and 26 are in line with openings 12 and then the neck 20 of the top vessel is inserted into the bottom vessel. The tapered wall portion 18 of the top vessel will come to rest on flange 8 of the bottom vessel so as to prevent the filter member from engaging the bottom wall of the bottom vessel. Then the top vessel is rotated until its tabs 24 are directly beneath tabs 10. In this position the top vessel cannot move up or down relative to the bottom vessel.

Thereafter the brewer is placed on a burner or other heating element and heated. As the brewer is heated, the air in the top vessel 16 expands and seeks to escape therefrom. Since the vent hole is closed, the only avenue of escape is through the filter member. The escaping air bubbles through the water 52 and escapes to the atmosphere via spout 4. Water vapor replaces some of the air as heating progresses. When a suitable quantity of air has been purged from the top vessel, the brewer is removed from the burner and allowed to cool. In practice this is done when it appears that the water in the bottom vessel is about to start boiling or has just started boiling. However, it is not mandatory that heating be terminated when the water in the bottom vessel is at the boiling point. Boiling or near boiling is merely a convenient indicator.

As the top vessel cools, and it does so more rapidly than the bottom vessel due to the hot water in the latter, the air in the top vessel contracts and the water vapor condenses, causing a drop in pressure. Viewed another way, it may be said that a vacuum is produced in the upper vessel as it cools. As soon as this occurs, the atmospheric pressure acts on the surface of the water in the bottom vesel to force it into the upper vessel. A little water passes through flange 30 into the charge of coffee but most of it passes through central cylinder 32. This inflow of water continues until the vacuum is eliminated, that is, until the pressure within the upper vessel and the atmospheric pressure are equalized. Brewing commences with the inflow of water and continues until the water is removed from the top vessel.

After the inflow cycle has been completed, the upper vessel is unlocked (by rotating it relative to the lower vessel until tabs 24 are aligned with openings 12) and lifted until the filter is clear of any water remaining in the bottom vessel. As soon as this is done the brew water in the upper vessel will begin to fall by gravity through the filter back into the lower vessel. The central cylinder 32 of the filter acts as a vent as soon as the filter is lifted clear of the water in the lower vessel. However, to speed up the gravity flow of the brew water to the lower vessel it is preferred to open the vent valve 42 by depressing button 46. This can be done with the user's fingers or by a spoon or similar kitchen utensil. A spoon or similar utensil may be preferred to avoid the possibility of being burned should any steam be trapped in the upper vessel and escape through vent hole 38. In practice this possibility does not exist because (a) the brewer is removed from the burner before the water starts to boil and (b) the top vessel will have cooled sufficiently to condense any steam therein since cooling is necessary to start the inflow cycle. To avoid having to hold the top vessel in elevated position until all of the water has returned to the bottom vessel, it is necessary only to lift the top vessel until tabs 26 are higher than flange 8, rotate the upper vessel until tabs 26 are no longer aligned with openings 12, and lower the upper vessel until tabs 26 engage and rest upon the flange which will then support the top vessel. After all of the brew water has drained back into the lower vessel, the top vessel is removed. Then the coffee beverage is served from the bottom vessel through pour spout 4.

Figure 4:
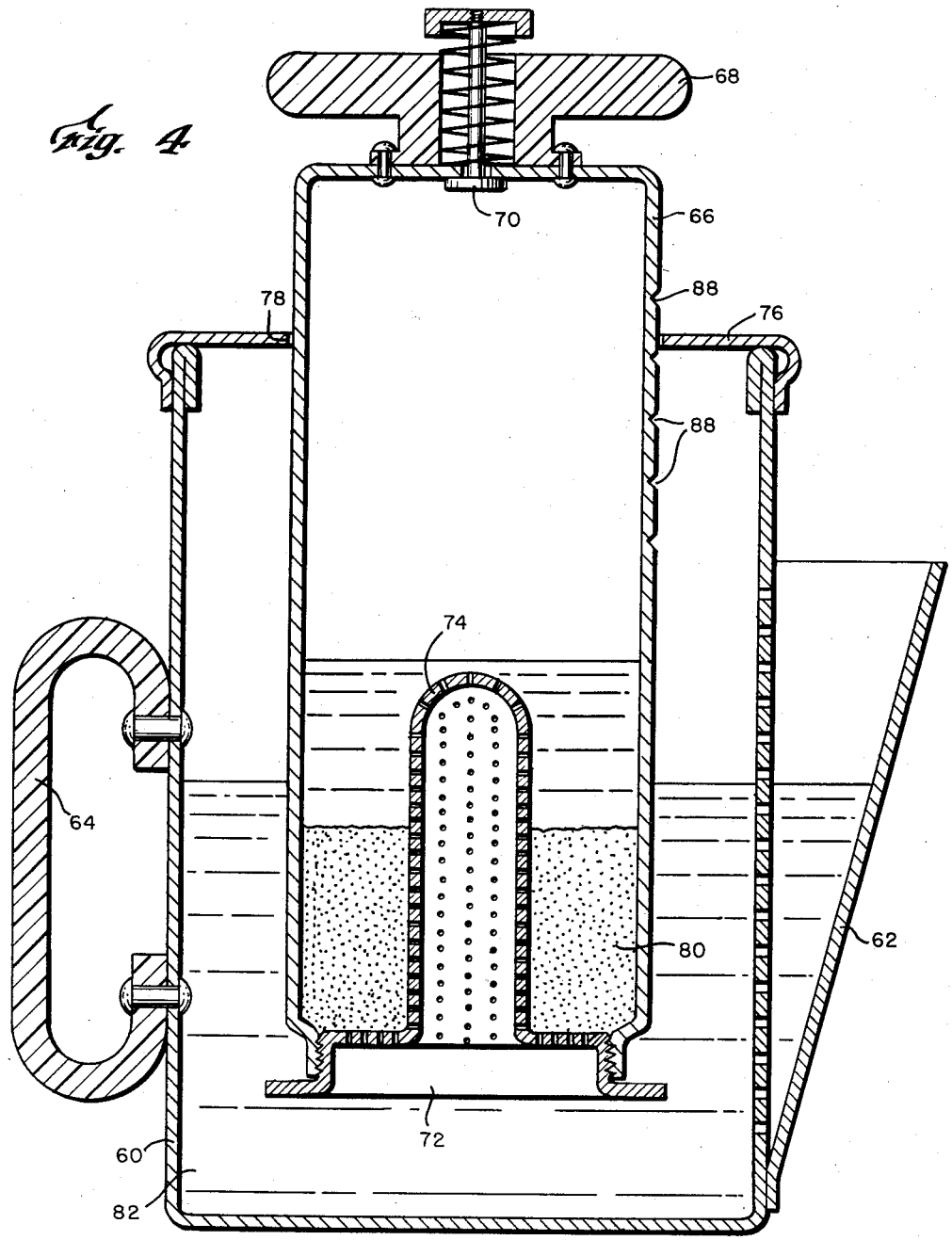
Fig. 4 is a sectional view in elevation of a second form of the present invention.

Fig. 4 shows a second embodiment of the present invention. This embodiment comprises an open bottom vessel 60 having a pour spout 62 and a handle 64. Associated with the bottom vessel is a top vessel 66 provided with a lift knob 68 and a vent valve 70 corresponding in structure to the valve of the embodiment of Fig. 1. The bottom end of vessel 66 is threaded to receive a non-clog filter 72 having a central cone or cylinder 74. The diameter of vessel 66 is smaller than that of vessel 60 so that the former will be movable up and down relative to the latter. While the bottom vessel 60 may be entirely open at the top, it is preferred to provide a removable cover 76 having a central opening 78 which is just large enough to slidably receive top vessel 66. Cover 76 acts as a guide to keep vessel 66 vertical.

In operating this type of brewer, a charge of coffee 80 is placed in top vessel 66 and retained therein by filter 72. A suitable volume of water 82 is placed in bottom vessel 60. Then cover 76 is slipped over top vessel 66 and the latter is inserted in the bottom vessel with the filter end down as shown in Fig. 4. Due to the fact that air is trapped within it, the top vessel will float in the water with the filter extending slightly below the water surface. In Fig. 4 the top vessel 66 is shown partly submerged in the water within the lower vessel, as it would be during the inflow cycle.

This brewer is then placed on a burner and heated. Heating causes the air in the upper vessel to expand and to escape through the water in the lower vessel. Water vapor will replace some of the air in the upper vessel. As soon as the water begins to boil or shortly before, the brewer is removed from the burner and allowed to cool. Upon cooling the air in the upper vessel contracts and as it does, water will enter the top vessel and cause it to sink in the bottom vessel. The hot inflowing water will flow through the coffee as well as through the central cylinder portion 74 of the filter to commence the brewing action. The upper vessel is allowed to remain in sunken position long enough to assure full brewing of the coffee beverage. The upper vessel is raised until its bottom end is above the level of water remaining in the lower vessel so as to allow the brew water to percolate by gravity back into the bottom vessel. The central cylinder portion 74 of the filter may relied upon as a vent during this step. However, to hasten the return of brew water back to the bottom vessel, it is preferred to additionally vent the upper vessel by opening valve 70. When no more brew water remains in the upper vessel, it is removed and the coffee beverage is served from the bottom vessel.

When the foregoing method is followed the embodiment of Fig. 4 is characterized by the same advantages as the embodiment of Fig. 1; namely, the coffee in the upper vessel is not contacted with boiling water and the volatile components of the coffee are confined during the heating and brewing cycles. Moreover if the volatile components of the coffee escape into the water in the bottom vessel during the inflow cycle, they are rapidly dissolved and are thereby trapped against escape to the atmosphere.

It is to be noted that the provision of valve 70 allows an alternate method of operation. According to this alternate method, when the water in the lower vessel commences to boil, valve 70 is opened. When this is done the upper vessel is vented to the atmosphere and will sink rapidly in the water in the lower vessel. When using valve 70 in this manner there is no need to wait for the upper vessel to cool to reduce the pressure therein. The inflow is accomplished by venting by means of valve 70. This alternate method of operation is not as foolproof as the method previously outlined since brewing action can conceivably take place with boiling water under such conditions. However, it is faster since it eliminates the cooling step. At the same time it is a substantial improvement over brewing methods practiced theretofore since (1) the coffee in the upper vessel is not being boiled to destruction during the heating (purging) cycle and (2) the brewing takes place in an enclosed chamber which prevents the volatile essences of the coffee from escaping from the upper vessel except through the water in the bottom vessel, in which water the volatile essences are trapped.

In constructing brewing apparatus of the type shown in Fig. 1, a particular structural limitation must be observed if the inflow cycle is to take place rapidly. The coffee supported on the filter member is heated during the heating cycle, and as it heats up it gives off gaseous products which increase the internal pressure in the upper vessel. This increase in pressure tends to restrict the inflow of water during the inflow cycle. It has been found that it is possible to overcome this condition and still cause enough air displacement for proper inflow by observing a predetermined minimum ratio between the volume of the air in the upper vessel and the volume of the charge of brew material. This minimum ratio has been established at about 2 to 1; that is, two volumes of air to one volume of coffee.

This same ratio is observed in constructing coffee brewers of the floating chamber type illustrated in Fig. 4. However, where the coffee brewer of this latter type is to be used according to the alternate method; that is, as a "plunge" system by venting the upper vessel, the ratio of free air space to brew material does not apply. Instead the enclosed upper chamber need have only enough free air space to buoyantly float on the water in the lower vessel until the time for plunging has arrived.

With respect to the aforesaid ratio of volumes, the following discussion is believed to be enlightening. A given air flow out of the enclosed vessel will produce a given inflow of water for brewing. If the brew material occupies a large portion of the enclosed upper vessel, a more thorough air purge is required to obtain sufficient inflow of water to thoroughly wet the coffee. This will require a relatively long cycle of heating. This heating cycle can be shortened by providing a chamber which is large with respect to the brew material. In this manner a given temperature rise will purge more air which will then produce the required inflow with a shorter cycle.

For a given temperature rise more air will be purged out of a large chamber than a small one, and since it is the total air removed that determines the total water inflow, the designer must select a chamber that has sufficient air space after being loaded with brew material to give him the purge (in terms of total air displacement) that will in turn produce the required inflow of liquid for brewing. In order to avoid overcooking the brew material and since the boiling of the liquid in the main vessel is a convenient indicator of when to discontinue the application of heat, the chamber volume should be of such magnitude that the desired purge of air is completed just as or shortly before the liquid in the bottom vessel begins to boil. The aforesaid 2 to 1 ratio is the minimum practical. A smaller ratio, e.g., 1 volume of free air space to 1 volume of coffee is not practical commercially since usually insufficient purging is obtained at or below the boiling point to cause enough liquid inflow to produce a good brewing. A 1 to 1 ratio can be made to produce sufficient purging only if heat is continued to be applied after boiling has been reached. This is unsatisfactory for various reasons already discussed and because of the length of time involved.

Although 2 to 1 is the practical minimum, it has been found that a minimum ratio of 3 to 1 is preferred. Ratios larger than 3 to 1 can be employed since the larger the free air space the more air can be removed in heating the water up to boiling. Moreover the larger the ratio, the shorter will be the over-all brewing operation. Since for commercial purposes the upper vessel cannot be made ridiculously large, the designer must comprise between the size of the air chamber and the length of time that can be tolerated in brewing the beverage. For practical purposes the maximum ratio should be about 5 to 1. For a 4-cup brewer, a 5 to 1 ratio has been found to give a cooling cycle of about five minutes, that is, brewing takes place in about five minutes after the brewer is removed from the heat. This time can be shortened by providing cooling fins such as fins 86 (Fig. 1) on the exterior surface of the upper vessel, by blowing air by the upper vessel, or by running cold water over the upper vessel.

An indication of the progress of the brewing operation is had by observing the liquid level or (in the embodiment of Fig. 4) by observing the buoyancy of the upper vessel. In the embodiment of Fig. 1, the liquid level in the bottom vessel can be used as in indicator by making the vessel of transparent glass or by providing a deep pouring spout (as illustrated) in which the liquid level can be seen. In the embodiment of Fig. 4, scale markings 88 can be provided on the upper vessel to provide an indication of how many cups of liquid are present in the bottom vessel prior to heating and how much the upper vessel has dropped in the bottom vessel after cooling.

It is to be noted that the mouth of the upper chamber; that is, the opening in which the filter is positioned, should be as large as possible since a large opening provides less resistance to liquid and air flow and thus permits inflow and draining of the water to be accomplished more rapidly. Moreover a large opening permits the use of a large filter which is advantageous since it presents more openings through which liquid and air can pass and has a greater coffee holding capacity.

While the inflow time may be shortened by venting the heated air and water vapor from the upper vessel rather than waiting for reduced pressure through cooling prior to brewing, it will be understood that this heated air will also contain certain aromatic volatiles which have escaped upwardly from the heated coffee prior to liquid contact. Of course, I consider it preferable to trap these aromatic volatiles in the liquid, and therefore, prefer the mode of operation which does not vent them. However, with either mode of operation, the air bubbles through the liquid during heating and a major portion of these aromatic volatiles are trapped. Accordingly, I intend to claim both forms broadly herein.

Obviously many modifications and variations of the present invention are possible in the light of the above teachings. Therefore, it is to be understood that the invention is not to be confined to the details of construction and arrangement of parts specifically described or illustrated but is rather to be limited only in the terms of the appended claim.

I claim:

Apparatus for brewing coffee comprising, a coffee pot, a float mounted in the top of said pot for vertical motion therein depending on the level of liquid in said pot and having a substantial portion thereof exposed to view above said pot, indicia markings on the said exposed portion for indicating the quantity of water in said pot when said float is floating on liquid in said pot, said float having an opening in the bottom end thereof, a coffee grounds receptacle mounted in the lower end of said float parallel adjacent to and just above the liquid level in said float when said float is floating on liquid in said pot, and the ratio of air volume to coffee volume in said float being between 2 to 1 and 5 to 1 whereby the level of said float immediately after filling said pot with water indicates the amount of water therein, whereby heating said pot with water therein drives a substantial portion of the air in said float out of said opening through said water and whereby cooling said float after heating the same causes it to sink in said pot and draw water into said float adjacent to said grounds.

References Cited in the file of this patent

UNITED STATES PATENTS

| 1,267,405 | Hammerstein | May 28, 1918 |
| 2,079,603 | Davis | May 11, 1937 |
| 2,292,504 | Bennett | Aug. 11, 1942 |
| 2,599,812 | Cronholm | June 10, 1952 |